(12) United States Patent
Kawaguchi

(10) Patent No.: US 10,845,225 B2
(45) Date of Patent: Nov. 24, 2020

(54) CLAMP-ON TYPE ULTRASONIC FLOWMETER

(71) Applicant: Keyence Corporation, Osaka (JP)

(72) Inventor: Yasunori Kawaguchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/568,290

(22) Filed: Sep. 12, 2019

(65) Prior Publication Data

US 2020/0116537 A1 Apr. 16, 2020

(30) Foreign Application Priority Data

Oct. 11, 2018 (JP) .................................. 2018-192967

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC ....................................................... G01F 1/66
See application file for complete search history.

(56) References Cited

U.S. PATENT DOCUMENTS

| | | | | |
|---|---|---|---|---|
| 6,026,693 | A * | 2/2000 | Baumoel | G01F 1/662 73/861.27 |
| 6,626,049 | B1 * | 9/2003 | Ao | G01F 1/662 73/861.29 |
| 7,963,177 | B2 * | 6/2011 | Gysling | G01F 15/14 73/861.28 |
| 8,955,392 | B2 * | 2/2015 | Liu | G01F 1/66 73/861.28 |
| 2019/0285449 | A1 | 9/2019 | Niimura | |
| 2019/0285450 | A1 | 9/2019 | Tsukigi et al. | |
| 2020/0209027 | A1 * | 7/2020 | Yamazaki | G01F 15/075 |

FOREIGN PATENT DOCUMENTS

| | | |
|---|---|---|
| JP | S6238355 A | 2/1987 |
| JP | 2014157129 A | 8/2014 |
| JP | 2016109555 A | 6/2016 |
| JP | 2018077079 A | 5/2018 |
| JP | 2018105735 A | 7/2018 |
| JP | 2018119878 A | 8/2018 |

OTHER PUBLICATIONS

U.S. Appl. No. 16/574,174, filed Sep. 18, 2019 (67 pages).

* cited by examiner

*Primary Examiner* — Jewel V Dowtin
(74) *Attorney, Agent, or Firm* — Kilyk & Bowersox, P.L.L.C.

(57) ABSTRACT

To improve installation work on piping for a clamp-on type ultrasonic flowmeter including a damping member. A damping member is provided in a state of being in contact with piping, and the damping member is a sheet-shaped molded article which has moderate flexibility and a predetermined thickness. In addition, the damping member has viscoelasticity and has adhesion and peelability to the metal piping. The damping member is fixed to the piping by a damping fixture surrounding an outer periphery of the damping member, and the damping member is pressed against the piping by the damping fixture. A flow sensor body is fixed on the damping member.

20 Claims, 8 Drawing Sheets

CLAMP-ON TYPE ULTRASONIC FLOWMETER

CROSS-REFERENCE TO RELATED APPLICATIONS

The present application claims foreign priority based on Japanese Patent Application No. 2018-192967, filed Oct. 11, 2018, the contents of which is incorporated herein by reference.

BACKGROUND OF THE INVENTION

1. Field of the Invention

The present invention relates to a flowmeter which generally measures a flow velocity and a flow rate of a fluid flowing in piping using an ultrasonic wave, and more specifically to a clamp-on type ultrasonic flowmeter which is installed post-fitting on piping.

2. Description of Related Art

There has been known a measuring instrument using an ultrasonic wave to measure a flow velocity and a flow rate of a fluid flowing in piping. This kind of measuring instrument is called an "ultrasonic flowmeter".

A principle of the ultrasonic flowmeter basically utilizes, when an ultrasonic wave is made obliquely crossing a fluid flowing in piping (a fluid to be measured), a time difference between an outward path propagation time for propagating in a flowing direction of the fluid and a return path propagation time for propagating in a direction opposite to the flowing direction of the fluid. The ultrasonic flowmeter measures the flow rate and volume of the fluid based on the time difference.

An example of a method of detecting a "time difference" in the ultrasonic flowmeter will be described. First, a burst ultrasonic signal is intermittently emitted, and a received waveform thereof is A/D converted to be sampled at a high speed. Here, a burst ultrasonic signal is a signal where ultrasonic pulses of several MHz, for example, ten times of pulses become a lump. An outward path reception waveform and a return path reception waveform are aligned respectively taking a time point at which they are emitted as an origin, and waveform shape matching is performed while displacing relatively in a time direction from the aligned state. A time shift amount in which the matching degree reaches maximum is determined as a propagation time difference and the flow velocity or the flow rate is calculated based on the propagation time difference.

As an ultrasonic flowmeter, there has been known an ultrasonic flowmeter which is installed on piping in a post-fitting mode. The post-fitting ultrasonic flowmeter is called a clamp-on type flowmeter (JP-A-2018-77079 and JP-A-2018-119878).

There have been known a "V-shape arrangement" and a "Z-shape arrangement" with respect to an arrangement of a first ultrasonic device and a second ultrasonic device included in a clamp-on type ultrasonic flowmeter. The "V-shape arrangement" means that the first ultrasonic device and the second ultrasonic device are respectively arranged on a first mother line of piping at a first position and a second position apart from each other in an axial direction of the piping. The "Z-shape arrangement" means that the first ultrasonic device is arranged on the first mother line of the piping, the second ultrasonic device is arranged on a second mother line which opposes the first mother line in a diameter direction, and the first ultrasonic device and the second ultrasonic device are positioned apart from each other in the axial direction of the piping.

JP-A-2018-119878 discloses details of fixtures respectively suitable for the V-shape arrangement and the Z-shape arrangement and details of installation work of a flowmeter using the fixture. Therefore, contents disclosed in JP-A-2018-119878 are incorporated in the specification.

The clamp-on type ultrasonic flowmeter has a problem that a transmission loss occurs as ultrasonic signals cross the wall of the piping. That is, the piping and a fluid to be measured differ in acoustic impedance. When the acoustic impedance value differs greatly, a transmission loss occurs due to a reflection at an interface between the piping and the fluid. In addition, a noise component is generated. When the intensity of the noise component increases, it becomes difficult to detect an ultrasonic signal propagating in a normal path.

The noise component includes a background noise. The background noise can be handled by increasing the signal intensity of an ultrasonic wave. However, as the intensity of the ultrasonic signal is increased, a problem that a so-called sneak path signal (a stray signal) or a reverberation signal propagating in parallel with an axis of the piping taking the piping material as a medium increases, becomes evident. Therefore, it is not possible to ensure desired detection accuracy only by increasing the intensity of the ultrasonic signal.

Sound refraction occurs at an interface between different media. Ultrasonic waves include "longitudinal waves" and "transverse waves". The longitudinal waves and the transverse waves are refracted at different angles because the longitudinal waves and the transverse waves propagating in the piping material as a medium have different transmission velocities. A sonic signal propagating in the piping material as a medium is separated into two paths and is irregularly reflected at an outer wall and an inner wall of the piping, and thus stray signals occur.

Regarding this problem, (1) a longitudinal-wave-removal incidence method of setting an incident angle of an ultrasonic wave such that all longitudinal waves are totally reflected to make sonic signals propagating in the piping material as a medium into transverse signals only, (2) a method of setting an incident angle of an ultrasonic wave such that all longitudinal waves and transverse waves are totally reflected and generating a guide wave propagating in a direction parallel to the axis of the piping taking the piping material as a medium to vibrate the piping by the guide wave (JP-A-62-38355), etc. have been proposed.

The difficulty in ensuring the desired detection accuracy becomes evident when the piping is made with metal. In the metal piping, the transmission velocity of a sound signal is high and the sonic signal can hardly be attenuated, and thus stray signals and reverberation signals have a great influence on the detection accuracy. In other words, in the metal piping, there is a problem that it is highly possible that a noise component and an ultrasonic signal propagating in a normal path (a normal ultrasonic signal) are received at the same time and it is difficult to separate the normal ultrasonic signal and the noise component from the received signal. This problem becomes particularly evident as the diameter of the metal piping becomes smaller.

Since the acoustic impedance is related to density, the acoustic impedance of a gas is smaller than that of a liquid and the difference between the acoustic impedance of a gas and that of metal piping becomes larger. Due to this reason, the difficulty in ensuring the desired detection accuracy becomes more evident when a gas rather than a liquid is to be measured.

With respect to this problem, it has been proposed to arrange a member called "damping member" or "ultrasonic wave absorbing member" in the piping. To unify terms, the term "damping member" is used in the specification of the invention.

JP-A-2014-157129 has proposed a damping member with an uncross-linked rubber as its main body. JP-A-2016-109555 has proposed to arrange a releasing agent between piping and a damping member including an uncross-linked butyl rubber as a typical example. JP-A-2018-105735 has proposed to laminate an ultrasonic buffer (typical example: silicone rubber sponge) on an ultrasonic absorber including an uncross-linked butyl rubber as a typical example.

As can be seen from JP-A-2014-157129, JP-A-2016-109555, and JP-A-2018-105735, it has been known that a damping member having an uncross-linked butyl rubber as its main body is effective in improving the detection accuracy of a clamp-on type ultrasonic flowmeter.

A conventional damping member has a surface property of sticky stickiness and has characteristics that it is easily torn off like clay by an external force and it is easily plastically deformed. The characteristics have been hindering the installation work of a clamp-on type ultrasonic flowmeter.

In the installation work of the clamp-on type ultrasonic flowmeter, there are many cases where the damping member has to be peeled off from the piping and be installed again for several times in determining the installation positions of the first ultrasonic device and the second ultrasonic device or in determining the installation position of the damping member. When the damping member is peeled off from the piping and reinstalled, it is accompanied by troublesome work caused by the damping member such as breakage of the damping member, remaining of a rubber component on the piping, and reshaping the plastically deformed damping member to its original shape.

To be specific in this regard, it is difficult to know in advance what kind of installation can suitably obtain a damping effect when installing a damping member on the piping using a fixture, and delicacies are often required in the arrangement of the first and second ultrasonic devices. Accordingly, it is often necessary to change the installation position of the damping member several times to install to an optimum position. For this reason, it is a matter of fact that an expert who knows a flowmeter well enters an installation place to install a clamp-on type ultrasonic flowmeter including a damping member.

During a development of a clamp-on type ultrasonic flowmeter which can be effectively applied to metal piping and a gas which are the most difficult to measure, and can be installed even by a non-expert, the present inventor has recognized that it is necessary to also improve a damping member in a flowmeter which measures a gas in particular.

With the recognition that it is necessary to reconsider the characteristics of the damping member such as easiness of being torn off and poor peelability that a rubber component remains on the piping when being separated from the piping, the present inventor has done researches on a cross-linked rubber. Although a plurality of damping members made with cross-linked rubbers were prepared and researches were done from various points of views, contrary to expectation, no desired workability and damping performance were obtained by the plurality of damping members made with cross-linked rubbers.

It has been known that an interface transmittance of an ultrasonic signal between two objects depends on a "difference" in the acoustic impedance between the two objects. For this reason, as disclosed in JP-A-2014-157129, JP-A-2016-109555, and JP-A-2018-105735, the damping member has been designed primarily to approach or match the acoustic impedance of the piping. In other words, it can be said that a conventional clamp-on type ultrasonic flowmeter including a damping member is based on a design concept that "in-wall propagating waves propagating in the wall of the piping are introduced into an ultrasonic wave absorber and the in-wall propagating waves which have entered the ultrasonic wave absorber are absorbed by the ultrasonic wave absorber".

SUMMARY OF THE INVENTION

Based on the conventional design concept, the present inventor considered making the acoustic impedance of a damping member made with a cross-linked rubber approach or match the acoustic impedance of the metal piping. Then, various materials were added to the cross-linked rubber under the idea that it was only necessary to increase the density of the damping member in making the acoustic impedance of the damping member approach or match the acoustic impedance of the metal piping. However, no desired results were obtained. Further, the more additives were added in order to increase the numeric value of the acoustic impedance of the damping member to match the numeric value of the acoustic impedance of the metal piping, the lower the damping performance.

Based on this fact, the present inventor searched for main reasons why the desired damping performance could not be obtained even though the acoustic impedance of the damping member was matched to the acoustic impedance of the metal piping. When an additive is added to the cross-linked rubber, the damping member may become too hard or the additive may float on the surface. Then, the present inventor found that this results in deterioration of contact of the damping member to the piping, which degrades the damping performance.

In addition, the present inventor investigated a correlation between the damping performance and the "difference" in the acoustic impedance or acoustic matching between two objects from another point of view, and found out that no strong correlation was recognized.

From all the above research results, the present inventor has come to realize that it is unnecessary to stick to "the matching of the acoustic impedance between two objects", which constitutes the basis of the conventional concept, and have devised the invention.

An object of the invention is to provide a clamp-on type ultrasonic flowmeter which can improve installation work on piping for a clamp-on type ultrasonic flowmeter including a damping member.

In order to achieve the object, a first viewpoint of the invention provides a clamp-on type ultrasonic flowmeter which is installed post-fitting on piping in which a fluid to be measured flows, wherein the clamp-on type ultrasonic flowmeter includes an ultrasonic device which transmits and receives an ultrasonic signal, an ultrasonic transmitting section which transmits an ultrasonic signal emitted from the ultrasonic device to the piping and transmits an ultrasonic signal from the piping to the ultrasonic device, a first fixture which attaches the ultrasonic device and the ultrasonic transmitting section to the piping with the ultrasonic transmitting section in a state of being in contact with the piping, a damping member which is a viscoelastic damping member made with a cross-linked rubber provided in a state of being in direct contact with the piping and which has surface properties of stickiness and peelability, and a second fixture which attaches the damping member to the piping with the damping member in a state of being pressed against the piping and keeps the pressing-against state.

Here, the peelability basically means that an adhesive component does not remain on the piping when the damping member is peeled off from the piping.

In order to achieve the object, a second viewpoint of the invention provides a clamp-on type ultrasonic flowmeter which is installed post-fitting on piping in which a fluid to be measured flows, wherein the clamp-on type ultrasonic flowmeter includes an ultrasonic device which transmits and receives an ultrasonic signal, an ultrasonic transmitting section which transmits an ultrasonic signal emitted from the ultrasonic device to the piping and transmits an ultrasonic signal from the piping to the ultrasonic device, a first fixture which attaches the ultrasonic device and the ultrasonic transmitting section to the piping with the ultrasonic transmitting section in a state of being in contact with the piping, a damping member which is a viscoelastic damping member made with a cross-linked rubber provided in a state of being in direct contact with the piping and which has stickiness and peelability expressed by adding an adhesive to the cross-linked rubber, and a second fixture which attaches the damping member to the piping with the damping member in a state of being pressed against the piping and keeps the pressing-against state.

Here, the peelability basically means that an adhesive component does not remain on the piping when the damping member is peeled off from the piping.

In order to achieve the object, a third viewpoint of the invention provides a clamp-on type ultrasonic flowmeter which is installed post-fitting on piping in which a fluid to be measured flows, wherein the clamp-on type ultrasonic flowmeter includes an ultrasonic device which transmits and receives an ultrasonic signal, an ultrasonic transmitting section which transmits an ultrasonic signal emitted from the ultrasonic device to the piping and transmits an ultrasonic signal from the piping to the ultrasonic device, a first fixture which attaches the ultrasonic device and the ultrasonic transmitting section to the piping with the ultrasonic transmitting section in a state of being in contact with the piping, a damping member which is a viscoelastic damping member made with a cross-linked rubber provided in a state of being in direct contact with the piping and which has been subjected to surface working so as to express adhesion to the piping, and a second fixture which attaches the damping member to the piping with the damping member in a state of being pressed against the piping and keeps the pressing-against state.

The invention is configured focusing on surface characteristics of the damping member from a viewpoint that not only the viscoelasticity of the cross-linked rubber but also the adhesion to the piping is important. Then, by adding peelability to the characteristics of adhesion to the piping, the installation workability to the piping can be improved.

Effects and other objects of the invention will become apparent from a description of preferred embodiments of the invention with reference to the drawings.

DESCRIPTION OF EMBODIMENTS

Embodiments

Figure 1:
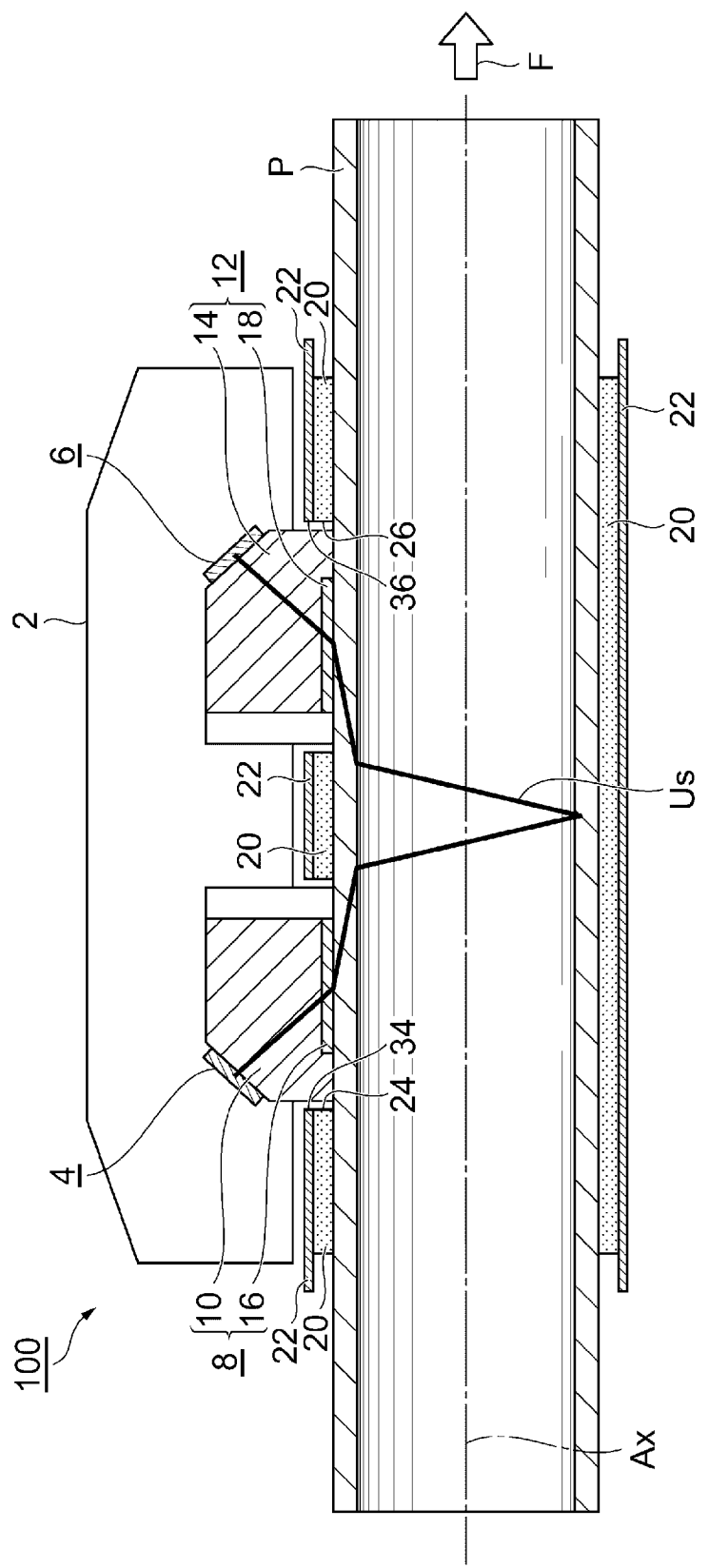
FIG. 1 is a conceptual diagram of a clamp-on type ultrasonic flowmeter of a first embodiment.

Preferred embodiments of the invention will be described below based on the attached drawings.

First Embodiment (FIG. 1 to FIG. 7)

FIG. 1 to FIG. 7 are drawings relating to a clamp-on type ultrasonic flowmeter 100 of the first embodiment. A summary of the clamp-on type ultrasonic flowmeter 100 will be described with reference to FIG. 1. The flowmeter 100 has a flow sensor body 2 installed on piping P. A first ultrasonic device 4 and a second ultrasonic device 6 which transmit and receive an ultrasonic wave are incorporated in the flow sensor body 2. The first and second ultrasonic devices 4 and 6 typically include a piezoelectric device.

In the clamp-on type ultrasonic flowmeter 100, the first and second ultrasonic devices 4 and 6 are arranged on a mother line of the piping P apart from each other in a direction of an axis Ax of the piping P. That is, the ultrasonic flowmeter 100 of the first embodiment is a so-called clamp-on type flowmeter of a V-shape arrangement or a reflection arrangement. Reference sign Us in FIG. 1 schematically represents a path of an ultrasonic signal transmitted and received between the first ultrasonic device 4 and the second ultrasonic device 6. For example, when a fluid to be measured is a gas such as compressed air, it is preferable that the ultrasonic signal forms a guide wave in the pipe wall of the piping P. In this case, the path of the ultrasonic signal is not necessarily as shown in FIG. 1.

The flow sensor body 2 includes a first wedge member 10 as a first ultrasonic transmitting section 8 adjacent to the first ultrasonic device 4, and a second wedge member 14 as a second ultrasonic transmitting section 12 adjacent to the second ultrasonic device 6. Further, the flow sensor body 2 preferably includes a first couplant 16 adjacent to the first wedge member 10 and a second couplant 18 adjacent to the second wedge member 14, and the first and second couplants 16 and 18 constitute part of the first and second ultrasonic transmitting sections 8 and 12 and are also included in a contact section to contact with the piping P. In order to improve installation workability, it is preferable that the first and second couplants 16 and 18 are formed with a solid couplant.

In FIG. 1, reference numeral 20 denotes a damping member. The damping member 20 has moderate flexibility and preferably is a sheet-shaped molded article having a predetermined thickness. The damping member 20 has viscoelasticity and has adhesion and peelability to the metal piping P. The damping member 20 can be easily deformed along the periphery of the piping P by manually rubbing by an operator.

The damping member 20 is arranged adjacent to the flow sensor body 2 and is arranged to surround the periphery of the piping P in a state of being in contact with the piping P. Then, the damping member 20 is fixed to the piping P by a damping fixture 22 surrounding an outer periphery of the damping member 20, and the damping member 20 is pressed against the piping P by the damping fixture 22. After the flow sensor body 2 is installed on the piping P, the damping fixture 22 keeps a state of pressing the damping member 20. That is, the damping fixture 22 has a size covering the entire area of the damping member 20 and maintains a pressing force which keeps the entire damping member 20 pressed against the piping P. In other words, the damping fixture 22 continues maintaining a pressure maintaining function against the damping member 20.

The piping P shown in the drawing is specifically metal piping (typically, iron or stainless steel piping) which takes a compressor constituting a part of factory facility as a compressed air generation source and has a comparatively small or moderate outer diameter (for example, about 25 mm to about 230 mm). However, the diameter and the metallic material of the metal piping P to which the clamp-on type ultrasonic flowmeter 100 is applicable are not limited thereto. The diameter of the piping P may exceed the numerical range exemplified above, and the metallic material of the piping P is not limited to iron or stainless steel (SUS). The material of the piping P may also be copper.

The clamp-on type ultrasonic flowmeter 100 measures a flow rate of a fluid flowing in the piping P based on ultrasonic signals transmitted and received between the first and second ultrasonic devices 4 and 6, and measures, for example, an instantaneous flow rate or an integrated flow rate corresponding to a propagation time difference between the ultrasonic signals. When the fluid to be measured is a gas, it may be configured to output a conversion flow rate under a predetermined condition corresponding to the temperature or pressure of the gas.

Figure 2:
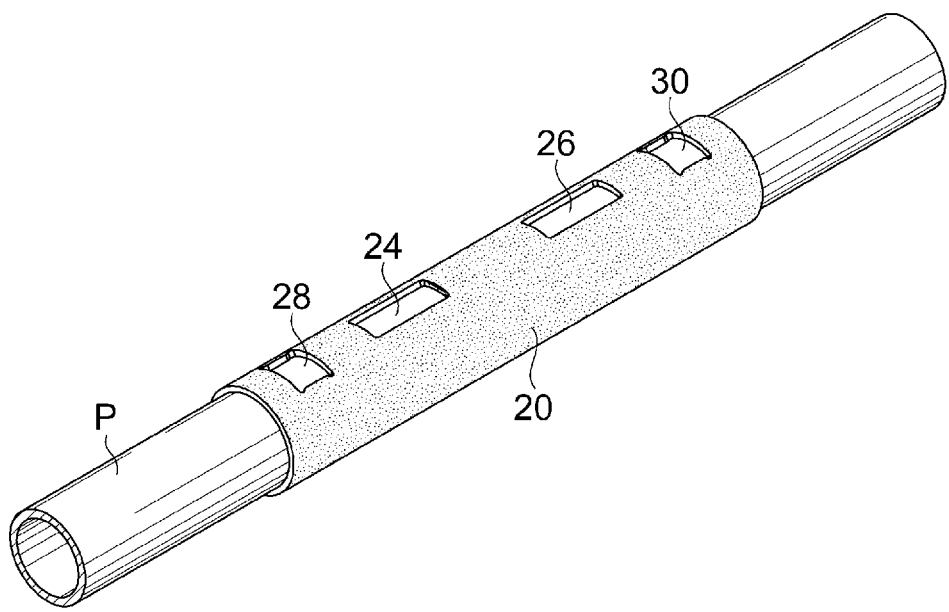
FIG. 2 is a diagram for explaining installation of a damping member to piping as a first step for installing a flow sensor body included in the first embodiment to the piping.

FIG. 2 to FIG. 5 are drawings for explaining procedures of installing the clamp-on type ultrasonic flowmeter 100 on the piping P. Before the flow sensor body 2 is installed on the piping P, the sheet-shaped damping member 20 is wound around the piping P as a first step. FIG. 2 shows a state in which the damping member 20 has been wound around the piping P. Reference numerals 24 and 26 shown in FIG. 2 denote damping windows arranged at positions corresponding to the first and second couplants 16 and 18 (FIG. 1). Ultrasonic waves passing through the first and second couplants 16 and 18 pass through the hollow first and second damping windows 24 and 26. In addition, reference numerals 28 and 30 shown in FIG. 2 denote abutting windows for abutting against the piping P when the clamp-on type ultrasonic flowmeter 100 has been attached to the piping. The abutting windows 28 and 30 are hollow.

For example, when the fluid to be measured is a gas such as compressed air, it is preferable that the ultrasonic signal forms a guide wave in the pipe wall of the piping P. In this case, by integrating the hollow first and second damping windows 24 and 26 together and making the space between the positions corresponding to the first and second couplants 16 and 18 (FIG. 1) into a damping window, it is possible to preferentially generate an inherent guide wave of the piping P.

It is preferable that a linear dimension of the damping member 20 in a circumferential direction of the piping P fits an outer peripheral dimension of the piping P. However, it may also be longer than the outer peripheral dimension of the piping P. In this case, one end portion of the damping member 20 is overlapped with the other end portion of the damping member 20 in the circumferential direction of the piping P. In addition, the linear dimension of the damping member 20 in the circumferential direction of the piping P may be shorter than the outer peripheral dimension of the piping P. In this case, one end portion and the other end portion of the damping member 20 are separated from each other in the circumferential direction of the piping P.

Figure 3:
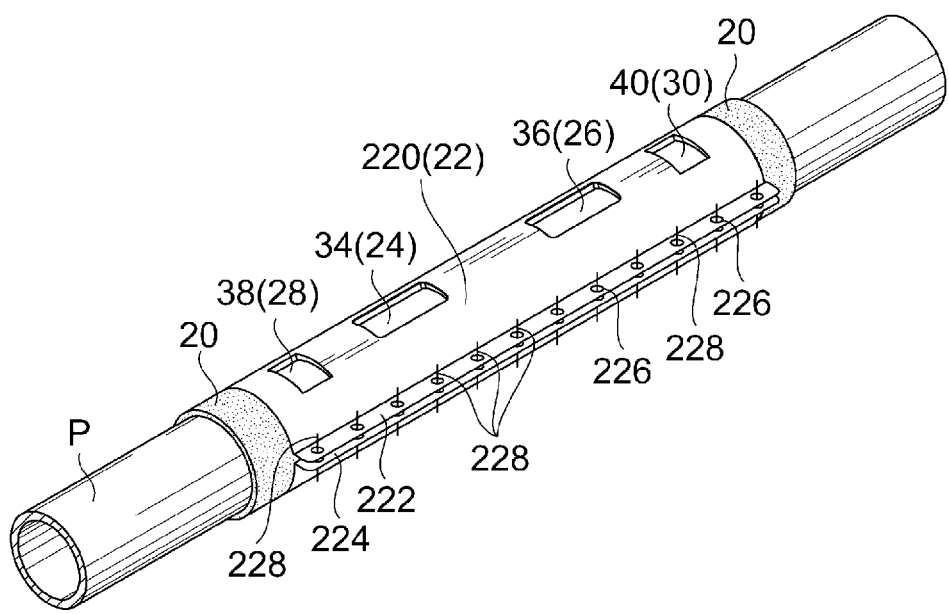
FIG. 3 is a diagram for explaining installation of a damping fixture on the damping member as a second step for installing the flow sensor body included in the first embodiment to the piping with the damping member being pressed against the piping by the damping fixture.

FIG. 3 shows a state in which the damping fixture 22 has been installed on the outer periphery of the damping member 20 as a second step. The damping fixture 22 has a fixture body 220 including a metal sheet, and a pair of thick flanges 222 and 224 arranged at both ends of the fixture body 220. The damping member 20 can be clamped on the piping P by fastening a fastener 228 of a bolt and nut communicating with a plurality of through holes 226 formed in the thick flanges 222 and 224 to decrease the diameter of the fixture body 220. The fasteners 228 are preferably arranged in the longitudinal direction of the piping P at regular intervals.

The damping fixture 22 has a size covering the entire area of the damping member 20 and has a first fixture window 34 and a second fixture window 36 aligned with the first and second damping window 24 and 26. The first and second fixture windows 34 and 36 are hollow. In addition, the damping fixture 22 (fixture body 220) has a third fixture window 38 and a fourth fixture window 40 corresponding to the abutting windows 28 and 30 of the damping member 20, and the third and fourth fixture windows 38 and 40 are hollow.

Figure 4:
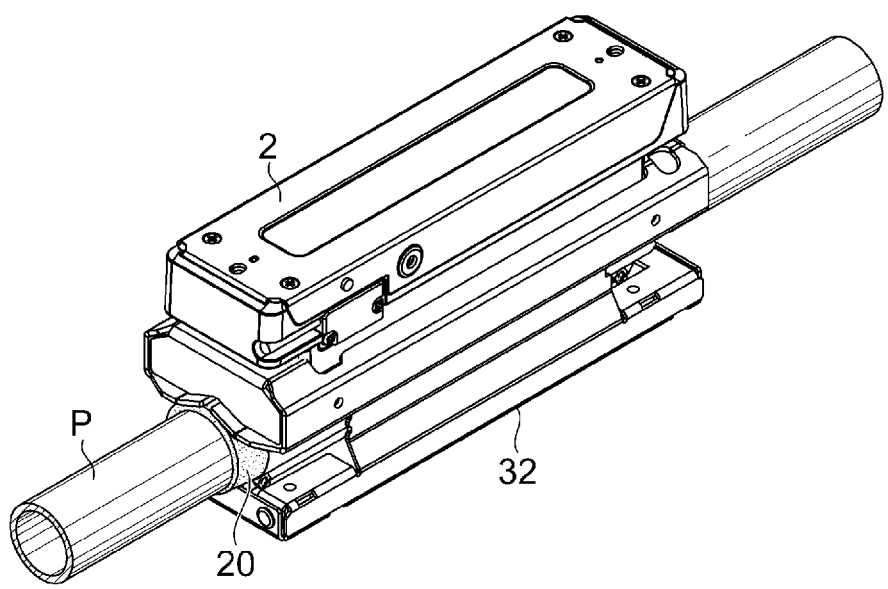
FIG. 4 is a diagram for explaining a preparation step of fixing the flow sensor body to the piping as a third step for installing the flow sensor body included in the first embodiment to the piping.
Figure 5:
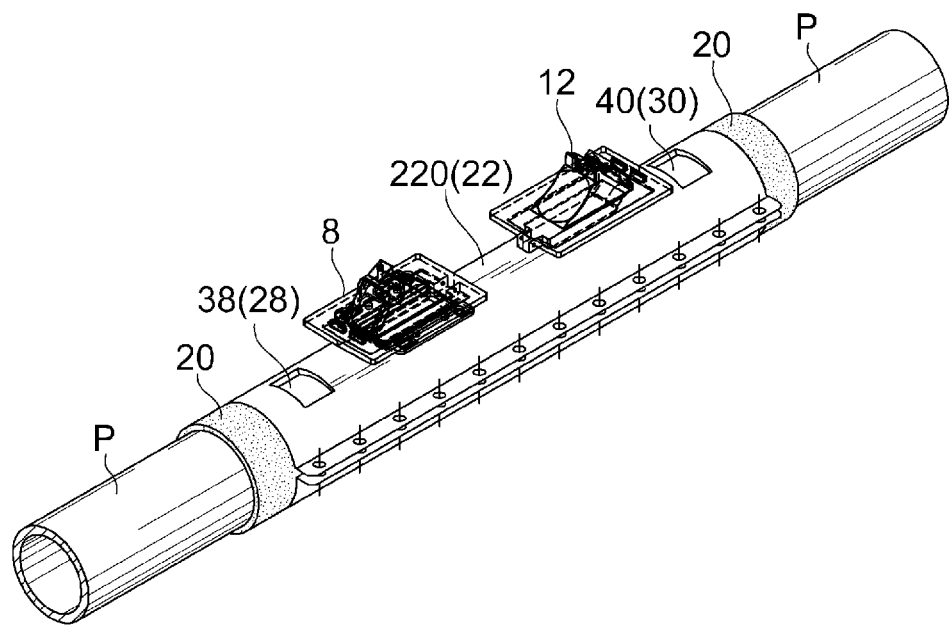
FIG. 5 is a diagram for explaining positioning a first ultrasonic device and a second ultrasonic device incorporated in the flow sensor body at predetermined positions by the third step described with reference to FIG. 4.

FIG. 4 shows a preparation step of fixing the flow sensor body 2 to the piping P as a third step. The flow sensor body 2 is fixed to the piping P using a plate-shaped sensor body fixture 32 opposing to the flow sensor body 2 and sandwiching the piping P with the flow sensor body 2. When the position of the flow sensor body 2 is determined, as shown in FIG. 5, the first and second ultrasonic devices 4 and 6, and the first and second ultrasonic transmitting sections 8 and 12 are positioned at desired positions.

Figure 6:
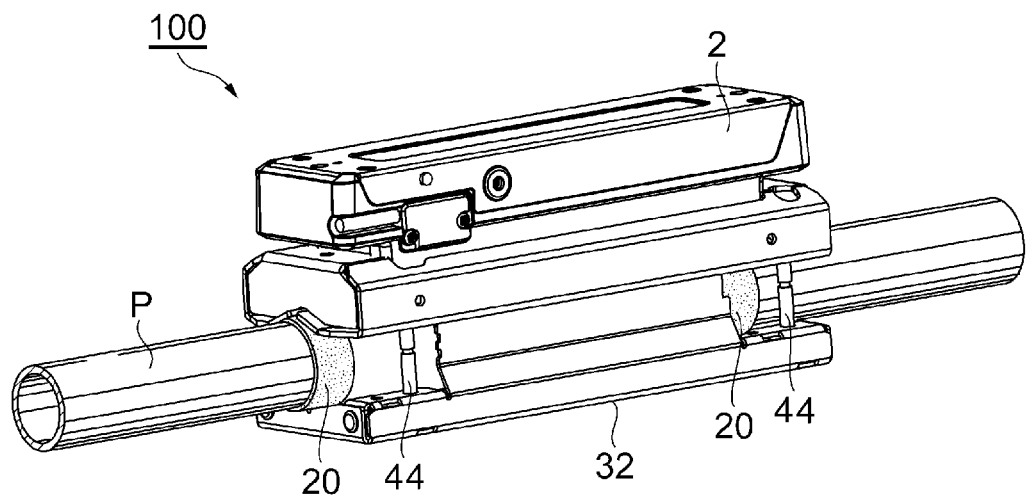
FIG. 6 is a diagram for explaining a state in which the flow sensor body included in the first embodiment is fixed to the piping.

FIG. 6 shows a state in which the flow sensor body 2 is fixed to the piping P. The flow sensor body 2 and the sensor body fixture 32 positioned opposing each other and sandwiching the piping P are fixed by fastening a plurality of fastening bolts 44. In this way, the piping P is in a state of being sandwiched by the flow sensor body 2 and the sensor body fixture 32. It is preferable that the plurality of the fastening bolts 44 are arranged at least at four corners of the flow sensor body 2 of a rectangular shape in a plan view.

Figure 7:
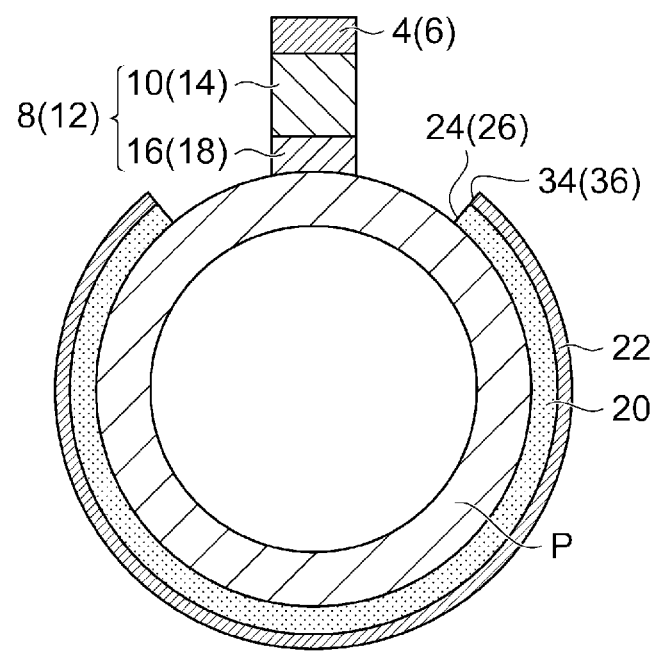
FIG. 7 is a cross-sectional view for conceptually explaining the state in which the flow sensor body included in the first embodiment is fixed to the piping.

FIG. 7 conceptually shows a state in which the flow sensor body 2 is fixed to the piping P. Referring to FIG. 7, the damping member 20 surrounds the outer periphery of the piping P in a state of being in direct contact with an outer peripheral surface of the piping P, and the damping member 20 is held in a state of being pressed towards the axis Ax of the piping P by the damping fixture 22 arranged on the outer periphery of the damping member 20. In this state, the first and second ultrasonic devices 4 and 6 transmit and receive ultrasonic waves to and from a gas flowing in the piping P through the first and second ultrasonic transmitting sections 8 and 12, and the damping windows 24 and 26 of the damping member 20, etc.

The operation of the ultrasonic flowmeter 100 is the same as that of a conventional flowmeter, and thus it is described in summary. An ultrasonic wave generated by the first ultrasonic device 4 is incident in a gas (for example, compressed air) to be measured flowing through the piping P. In FIG. 1, an arrow F indicates a direction the gas to be measured flows. The ultrasonic wave propagating in the gas to be measured is received by the second ultrasonic device 6, and the second ultrasonic device 6 outputs an analog signal based on the received ultrasonic wave. Then, the analog signal output from the second ultrasonic device 6 is A/D converted.

On the other hand, an ultrasonic wave generated by the second ultrasonic device 6 is incident in the gas flowing through the piping P. Then, the ultrasonic wave propagating in the gas is received by the first ultrasonic device 4, and the first ultrasonic device 4 outputs an analog signal based on the received ultrasonic wave. Next, the analog signal output from the first ultrasonic device 4 is A/D converted.

The flow sensor body 2 has a flow rate calculating section and the flow rate calculating section measures a time difference $\Delta T$ based on signals output by the first and second ultrasonic devices 4 and 6. The time difference $\Delta T$ is a "difference" between time T1 from an output of an ultrasonic wave from the first ultrasonic device 4 to a reception of the ultrasonic wave by the second ultrasonic device 6, and time T2 from an output of an ultrasonic wave from the second ultrasonic device 6 to a reception of the ultrasonic wave by the first ultrasonic device 4. Then, based on the obtained time difference $\Delta T$, a velocity of a fluid flowing in the piping P is calculated based on a predetermined expression and a flow rate of the fluid is calculated based on another predetermined expression.

Although a guide wave has been described with reference to JP-A-62-38355, in the flowmeter 100 of the first embodiment, the time difference $\Delta T$ may also be measured by using a guide wave.

The damping member 20 is preferably formed with a molded article formed in a sheet shape having a uniform thickness. The damping member 20 is made with a cross-linked rubber, for example, a butyl rubber (isobutylene-isoprene rubber (IIR)), ethylene (ethylene-propylene rubber (EPDM)), nitrile rubber (NBR) (acrylonitrile-butadiene rubber (BR)), fluororubber (FKM), epichlorohydrin rubber (ECO), norbornene rubber (NOR), etc., as its main body.

The damping member 20 has a characteristic of being difficult to be torn off by "cross-linking". In the case of a sheet-shaped molded article, the damping member 20 can be easily handled when an operator performs the installation work.

In the ultrasonic flowmeter 100, the adhesion of the damping member 20 to the piping P can be realized by any one of the following two methods, or a combination thereof.
(1) Stickiness:

When the damping member 20 has stickiness, it is possible to ensure the adhesion to the piping P. A cross-linked rubber generally does not have stickiness. It is only necessary to moderately add a thickening agent in order to endow the damping member 20 with moderate stickiness. Here, "moderate stickiness" means an adjustment of the stickiness including peelability. To be more specific with respect to the "moderate stickiness", when the damping member 20 has been peeled off from the piping P, it is needless to say that the damping member 20 does not break and no rubber component remains on the piping P. When the ease of installation workability is taken into consideration, stickiness and peelability like those of sticky notes are preferable. The damping member 20 is maintained in a pressed state by the damping fixture 22, and thus it is possible to ensure the adhesion to the piping P even with slight stickiness such as the sticky notes and it is possible to exhibit sufficient damping effect by the viscoelasticity of the damping member 20.

Examples of a thickening agent that can be added include coumarone-indene resin, alkylphenol resin, tenpenphenol and rosin.
(2) Smoothness:

By improving the smoothness of a surface of the damping member 20, especially a surface in contact with the piping P, the adhesion to the piping P can be ensured. When the damping member 20 is formed into a sheet shape, the surface of the damping member 20 can be smoothed by smoothing a shaped surface of a mold. The smoothness is preferably a smoothness that, by pressing the damping member 20 against the piping P, the damping member 20 is vacuum adsorbed. When the smoothness of the damping member 20 is defined by a surface frictional force (static friction coefficient), the static friction coefficient is 0.8 or more, preferably 1.3 or more.

The damping fixture 22 described above has a function of applying a pressing force to the damping member 20 and maintaining the pressing force. Therefore, by combining the aforementioned surface characteristics of stickiness and/or smoothness of the damping fixture 22 and the damping member 20, the adhesion of the damping member 20 to the piping P can be improved. In addition, by improving the adhesion, it is possible to vibrate the damping member 20 together with the vibrating piping P to absorb, attenuate, and buffer the vibration or to change a phase by the damping member 20.

The pressing force of the damping member 20 due to the damping fixture 22 is, for example, a pressing force of about pressing with fingers by 0.05 MPa to 0.8 MPa, preferably 0.1 MPa to 0.6 MPa, more preferably 0.2 MPa to 0.4 MPa. When the pressing force is too small, the damping effect lowers. The damping effect is stable when the pressing force is equal to or more than a predetermined value. When the pressing force is too large, the damping member 20 is deteriorated. The pressing force of the damping member 20 due to the damping fixture 22 can be adjusted by a fastening torque of the fastener 228.

The cross-linked rubber basically has the characteristic of viscoelasticity. The viscoelasticity can be defined from the viewpoint of loss tangent (tan δ: Loss tangent). The viscoelasticity is related to the damping effect of the damping member 20, and basically the greater the numeric value of the loss tangent, the higher the damping performance. Therefore, it is better that the loss tangent of the damping member 20 is 0.5 or more, preferably 1.0 or more.

Second Embodiment (FIG. 8 to FIG. 11)

Figure 8:
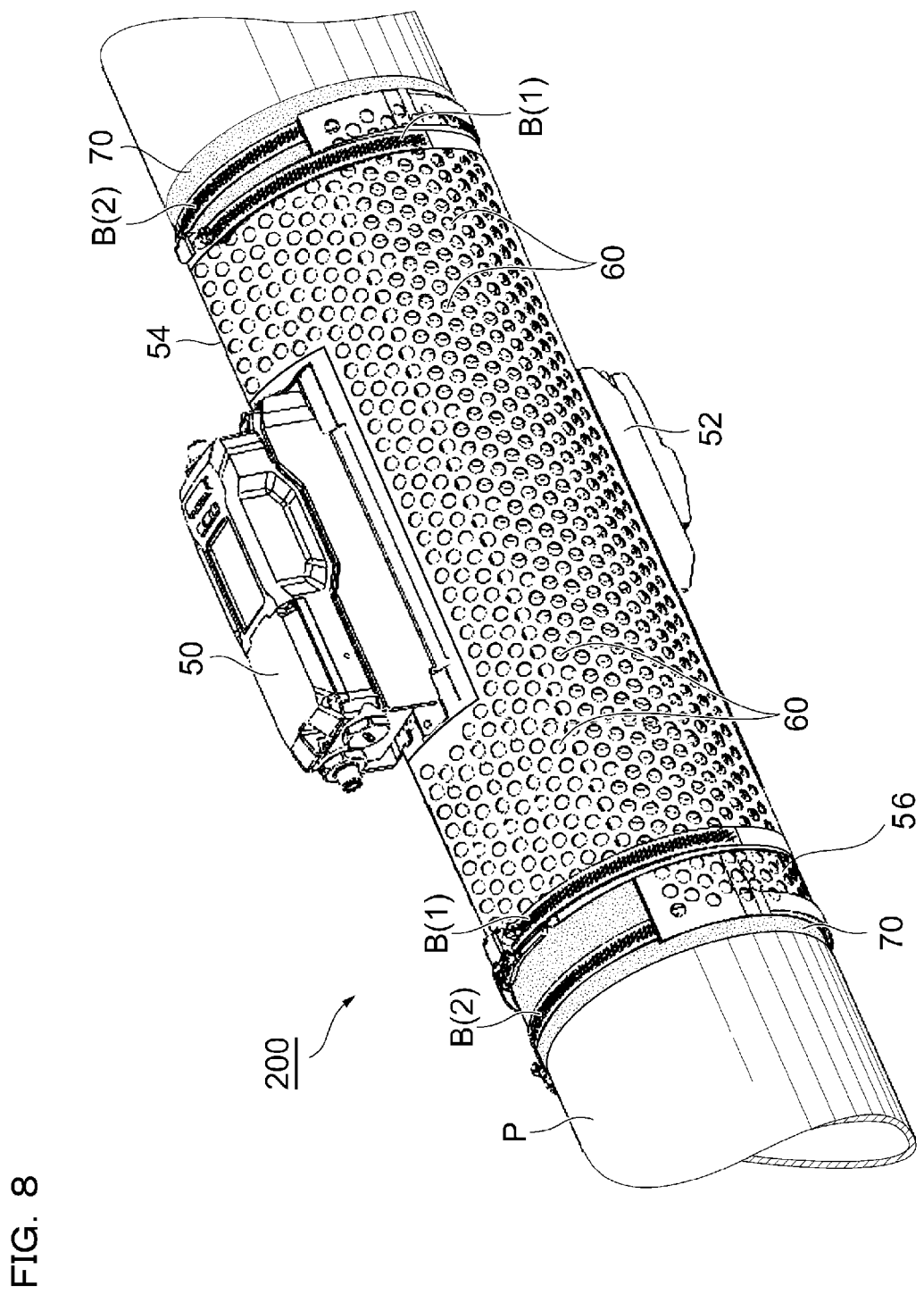
FIG. 8 is a perspective view of a clamp-on type ultrasonic flowmeter of a second embodiment attached to the piping.
Figure 9:
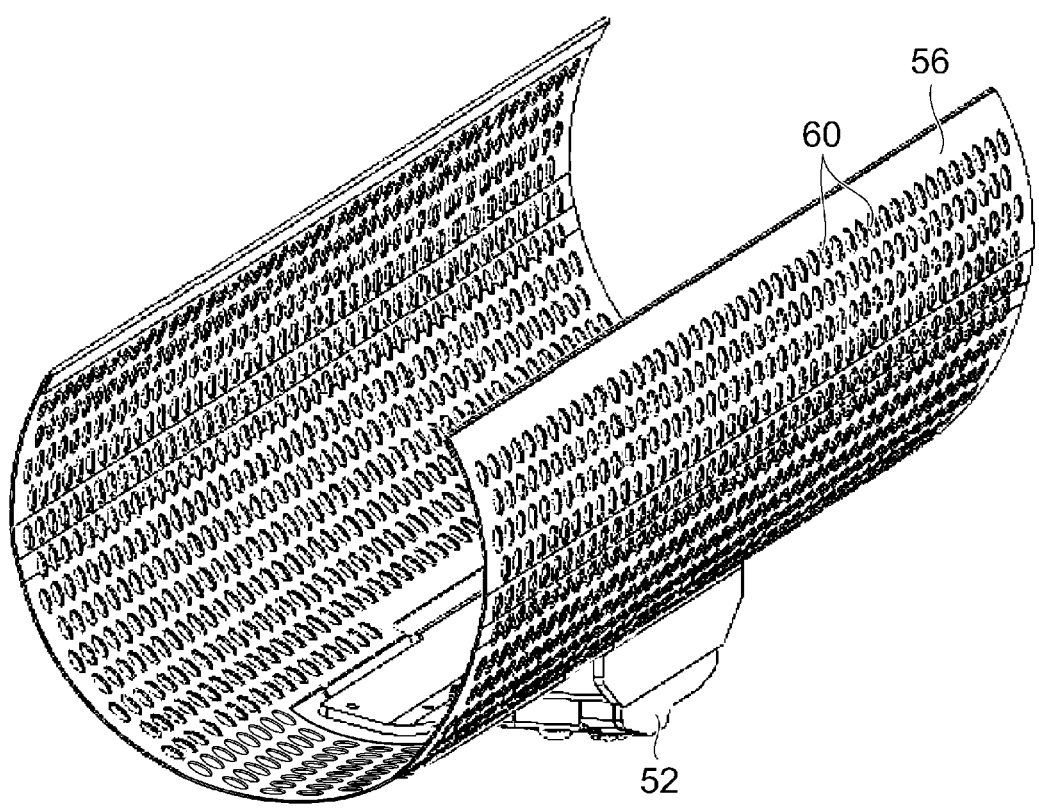
FIG. 9 is a perspective view of a second metal thin plate member for attaching a second sensor unit included in a second embodiment to the piping.
Figure 10:
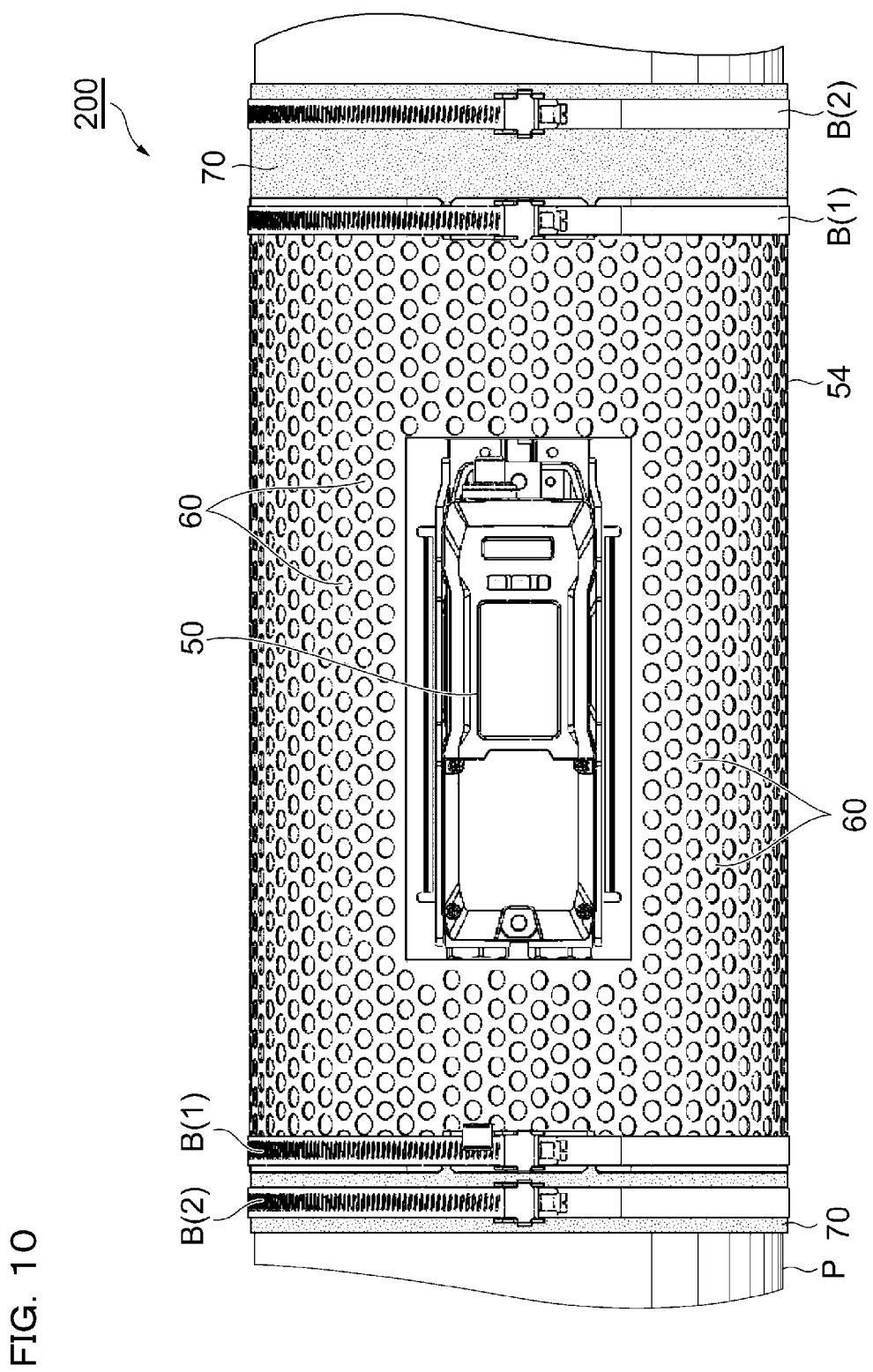
FIG. 10 is a plan view for explaining a state in which a first sensor unit 50 has been attached to the piping.

In FIG. 8 and FIG. 10, reference numeral 200 denotes a clamp-on type ultrasonic flowmeter of the second embodiment. The ultrasonic flowmeter 200 includes two sensor units, i.e., a first sensor unit 50 and a second sensor unit 52 (FIG. 8). The first ultrasonic device 4 and the first ultrasonic transmitting section 8 are incorporated in the first sensor unit 50. The second ultrasonic device 6 and the second ultrasonic transmitting section 12 are incorporated in the second sensor unit 52.

The clamp-on type ultrasonic flowmeter 200 of the second embodiment is a flowmeter of a Z-shape arrangement. That is, the first sensor unit 50 and the second sensor unit 52 are arranged opposing each other sandwiching the piping P. To be more specific, in the clamp-on type ultrasonic flowmeter 200 of the second embodiment, the first ultrasonic device 4 is arranged on the first mother line of the piping P and the second ultrasonic device 6 is arranged on a second mother line which opposes the first mother line in a diameter direction. Then, the first ultrasonic device 4 and the second ultrasonic device 6 are positioned apart from each other in the axial direction of the piping P.

In the clamp-on type ultrasonic flowmeter 200 of the second embodiment, the first sensor unit 50 and the second sensor unit 52 are fixed to the piping P using a plurality of bands B. To be specific, the first sensor unit 50 has a first metal thin plate member 54 attached to both sides of the first sensor unit 50, and a first band B(1) is attached to both longitudinal ends of the first thin plate member 54. The first sensor unit 50 is fixed to the piping P by arranging the first thin plate member 54 along the piping P and then winding and tightening the first band B(1).

Similarly, the second sensor unit 52 has a second metal thin plate member 56 attached to both sides of the second sensor unit 52 (FIG. 8 and FIG. 9), and a second band B(2) is attached to both longitudinal ends of the second thin plate member 56. The second band B(2) is not shown in FIG. 9. The second sensor unit 52 is fixed to the piping P by arranging the second thin plate member 56 along the piping P and then winding and tightening the second band B(2).

As can be seen from the above description, the first and second thin plate members 54 and 56, and the first and second bands B(1) and B(2) function as sensor body fixtures for fixing the first and second sensor units 50 and 52 to the piping P.

FIG. 8 and FIG. 10 show a state in which the installation work has been done in a procedure of first assembling the second sensor unit 52 to the piping P and then assembling the first sensor unit 50. FIG. 10 is a plan view for explaining a state in which the first sensor unit 50 has been attached to the piping. As a result of performing the work with this procedure, the first thin plate member 54 is positioned on the second thin plate member 56 in the drawings. Of course, it is fine to first assemble the first sensor unit 50 to the piping P and then assemble the second sensor unit 52 to the piping P.

The first and second thin plate members 54 and 56 shown in the drawings are formed with a so-called punching metal having a plurality of holes 60 in its entire area. However, this is not required.

The first and second thin plate members 54 and 56 can not only be deformed into shapes along the outer peripheral surface of the piping P which has a circular cross-section by fastening the bands B(1) and B(2) to fix the first and second sensor units 50 and 52 to the piping P, but also apply a pressing force to the entire area of a damping member 70 arranged between the piping P and the first and second thin plate members 54 and 56. Therefore, the first and second thin plate members 54 and 56, and the bands B(1) and B(2) function not only as sensor body fixtures for fixing the first and second sensor units 50 and 52 to the piping P but also as damping fixtures for fixing the damping member 70 to the piping P.

In the clamp-on type ultrasonic flowmeter 200 of the second embodiment, the damping member 70 is wound around the periphery of the piping P manually by an operator as a first step before the first and second sensor units 50 and 52 are installed on the piping P.

Figure 11:
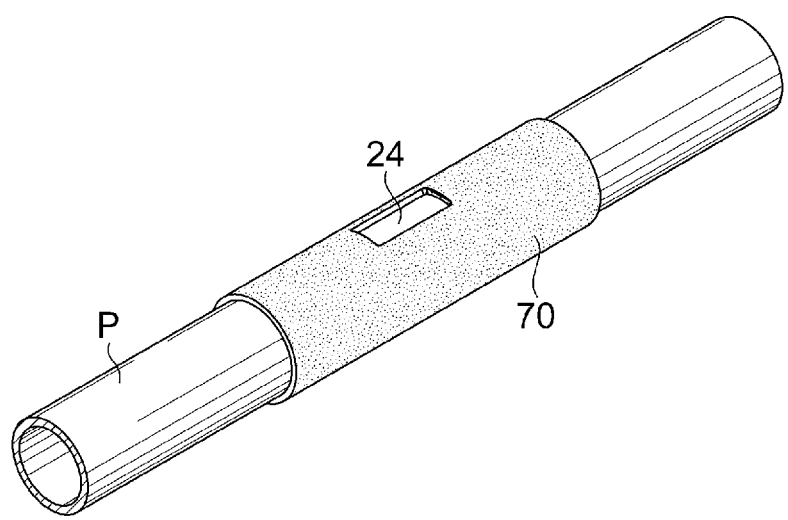
FIG. 11 is a diagram for explaining installation of a damping member to piping as a first step for installing a first sensor unit and a second sensor unit included in the second embodiment to the piping.

FIG. 11 shows a state in which the damping member 70 included in the clamp-on type ultrasonic flowmeter 200 has been arranged on the periphery of the piping P, and FIG. 11 is corresponding to FIG. 2 referenced in the first embodiment. The damping member 70 shown in FIG. 11 is substantially the same as the damping member 20 described in the first embodiment. However, in the clamp-on type ultrasonic flowmeter 200 of the second embodiment, the first and second ultrasonic devices 4 and 6 are arranged sandwiching the piping P, and thus the first and second damping windows 24 and 26 are arranged sandwiching the piping P when the damping member 70 is attached to the piping P. Due to drawing reasons, the second damping window 26 is not shown in FIG. 11.

The preferred first and second embodiments of the invention have been described above. However, the invention is not limited thereto and includes, for example, the following variations.

(1) In the first and second embodiments, the damping members 20 and 70 are arranged in the vicinities of the first and second ultrasonic transmitting sections 8 and 12. However, the damping members 20 and 70 may be arranged in positions apart from the first and second ultrasonic transmitting sections 8 and 12. Regarding the arrangement of the damping members 20 and 70, when the arrangement positions of the flow sensor body 2 and the first and second sensor units 50 and 52 are close to a joint (an end surface) of the piping P, the damping members 20 and 70 may be arranged in a space between the joint (end surface) of the piping P and the flow sensor body 2 or the first and second sensor units 50 and 52 in order to prevent reflected noises from the joint (end surface) of the piping P.

(2) It is needless to say that the invention can be applied to a clamp-on type ultrasonic flowmeter using a guide wave. That is, the clamp-on type ultrasonic flowmeter of the invention may be a flowmeter which sets an incident angle of an ultrasonic wave such that longitudinal waves and transverse waves are totally reflected, generates a guide wave propagating in a direction parallel to the axis of the piping with the piping material as a medium, and vibrates the piping by the guide wave to measure a flow velocity and a flow rate of a fluid flowing in the piping.

(3) The clamp-on type ultrasonic flowmeter may include a display device for displaying a measured flow rate such as an instantaneous flow rate and an integrated flow rate. The clamp-on type ultrasonic flowmeter may have a signal intensity detecting section which detects the intensity of an ultrasonic signal and the intensity of a stray signal, display information relating to a proper installation state of an ultrasonic transmitting section on the display device based on the intensity of the ultrasonic signal detected by the signal intensity detecting section, and display information relating to a proper installation state of the damping member on the display device based on a ratio between the intensity of the ultrasonic signal and the intensity of the stray signal detected by the signal intensity detecting section. By displaying information relating to a proper installation state of the damping member on the display device of the clamp-on type ultrasonic flowmeter, it is possible to prompt a proper installation of the damping member, or to prompt a readjustment of a fastener and a reattachment of the damping member, etc.

What is claimed is:

1. A clamp-on type ultrasonic flowmeter which is installed post-fitting on piping in which a fluid to be measured flows, wherein the clamp-on type ultrasonic flowmeter includes
    an ultrasonic device which transmits and receives an ultrasonic signal,
    an ultrasonic transmitting section which transmits an ultrasonic signal emitted from the ultrasonic device to the piping and transmits an ultrasonic signal from the piping to the ultrasonic device,
    a first fixture which attaches the ultrasonic device and the ultrasonic transmitting section to the piping with the ultrasonic transmitting section in a state of being in contact with the piping,
    a damping member which is a viscoelastic damping member made with a cross-linked rubber provided in a state of being in direct contact with the piping and which has surface properties of stickiness and peelability, and
    a second fixture which attaches the damping member to the piping with the damping member in a state of being pressed against the piping and keeps the pressing-against state.

2. The clamp-on type ultrasonic flowmeter according to claim 1, wherein the damping member is a sheet-shaped molded article.

3. The clamp-on type ultrasonic flowmeter according to claim 2, wherein the damping member has a hollow damping window at a position corresponding to the ultrasonic transmitting section.

4. The clamp-on type ultrasonic flowmeter according to claim 1, wherein the first fixture has a function of attaching the ultrasonic device and the ultrasonic transmitting section to the piping with the ultrasonic transmitting section in a state of being in contact with the piping, and a function of the second fixture of attaching the damping member to the piping with the damping member in a state of being pressed against the piping and keeping the pressing-against state, and
    the ultrasonic device, the ultrasonic transmitting section, and the damping member are attached to the piping by the first fixture.

5. The clamp-on type ultrasonic flowmeter according to claim 1, wherein the clamp-on type ultrasonic flowmeter sets an incident angle of an ultrasonic wave such that a longitudinal wave and a transverse wave are totally reflected, generates a guide wave propagating in a direction parallel to an axis of the piping with a piping material as a medium, and vibrates the piping by the guide wave to measure a flow rate of a fluid flowing in the piping.

6. The clamp-on type ultrasonic flowmeter according to claim 1, wherein the ultrasonic device includes a first ultrasonic device and a second ultrasonic device, and the first and second ultrasonic devices are arranged on a mother line of the piping being apart from each other in an axial direction of the piping.

7. The clamp-on type ultrasonic flowmeter according to claim 1, wherein the ultrasonic device includes a first ultrasonic device and a second ultrasonic device, and the first and second ultrasonic devices are arranged opposing each other sandwiching the piping.

8. A clamp-on type ultrasonic flowmeter which is installed post-fitting on piping in which a fluid to be measured flows, wherein the clamp-on type ultrasonic flowmeter includes
    an ultrasonic device which transmits and receives an ultrasonic signal,
    an ultrasonic transmitting section which transmits an ultrasonic signal emitted from the ultrasonic device to the piping and transmits an ultrasonic signal from the piping to the ultrasonic device,
    a first fixture which attaches the ultrasonic device and the ultrasonic transmitting section to the piping with the ultrasonic transmitting section in a state of being in contact with the piping,
    a damping member which is a viscoelastic damping member made with a cross-linked rubber provided in a state of being in direct contact with the piping and which has stickiness and peelability expressed by adding an adhesive to the cross-linked rubber, and
    a second fixture which attaches the damping member to the piping with the damping member in a state of being pressed against the piping and keeps the pressing-against state.

9. The clamp-on type ultrasonic flowmeter according to claim 8, wherein the damping member is a sheet-shaped molded article.

10. The clamp-on type ultrasonic flowmeter according to claim 9, wherein the damping member has a hollow damping window at a position corresponding to the ultrasonic transmitting section.

11. The clamp-on type ultrasonic flowmeter according to claim 8, wherein the first fixture has a function of attaching the ultrasonic device and the ultrasonic transmitting section to the piping with the ultrasonic transmitting section in a state of being in contact with the piping, and a function of the second fixture of attaching the damping member to the piping with the damping member in a state of being pressed against the piping and keeping the pressing-against state, and
    the ultrasonic device, the ultrasonic transmitting section, and the damping member are attached to the piping by the first fixture.

12. The clamp-on type ultrasonic flowmeter according to claim 8, wherein the clamp-on type ultrasonic flowmeter sets an incident angle of an ultrasonic wave such that a longitudinal wave and a transverse wave are totally reflected, generates a guide wave propagating in a direction parallel to an axis of the piping with a piping material as a medium, and vibrates the piping by the guide wave to measure a flow rate of a fluid flowing in the piping.

13. The clamp-on type ultrasonic flowmeter according to claim 8, wherein the ultrasonic device includes a first ultrasonic device and a second ultrasonic device, and the first and second ultrasonic devices are arranged on a mother line of the piping being apart from each other in an axial direction of the piping.

14. The clamp-on type ultrasonic flowmeter according to claim 8, wherein the ultrasonic device includes a first ultrasonic device and a second ultrasonic device, and the first and second ultrasonic devices are arranged opposing each other sandwiching the piping.

15. A clamp-on type ultrasonic flowmeter which is installed post-fitting on piping in which a fluid to be measured flows, wherein the clamp-on type ultrasonic flowmeter includes
- an ultrasonic device which transmits and receives an ultrasonic signal,
- an ultrasonic transmitting section which transmits an ultrasonic signal emitted from the ultrasonic device to the piping and transmits an ultrasonic signal from the piping to the ultrasonic device,
- a first fixture which attaches the ultrasonic device and the ultrasonic transmitting section to the piping with the ultrasonic transmitting section in a state of being in contact with the piping,
- a damping member which is a viscoelastic damping member made with a cross-linked rubber provided in a state of being in direct contact with the piping and which has been subjected to surface working so as to express adhesion to the piping, and
- a second fixture which attaches the damping member to the piping with the damping member in a state of being pressed against the piping and keeps the pressing-against state.

16. The clamp-on type ultrasonic flowmeter according to claim 15, wherein the damping member is a sheet-shaped molded article.

17. The clamp-on type ultrasonic flowmeter according to claim 16, wherein the damping member has a hollow damping window at a position corresponding to the ultrasonic transmitting section.

18. The clamp-on type ultrasonic flowmeter according to claim 16, wherein the first fixture has a function of attaching the ultrasonic device and the ultrasonic transmitting section to the piping with the ultrasonic transmitting section in a state of being in contact with the piping, and a function of the second fixture of attaching the damping member to the piping with the damping member in a state of being pressed against the piping and keeping the pressing-against state, and
- the ultrasonic device, the ultrasonic transmitting section, and the damping member are attached to the piping by the first fixture.

19. The clamp-on type ultrasonic flowmeter according to claim 16, wherein the clamp-on type ultrasonic flowmeter sets an incident angle of an ultrasonic wave such that a longitudinal wave and a transverse wave are totally reflected, generates a guide wave propagating in a direction parallel to an axis of the piping with a piping material as a medium, and vibrates the piping by the guide wave to measure a flow rate of a fluid flowing in the piping.

20. The clamp-on type ultrasonic flowmeter according to claim 16, wherein the ultrasonic device includes a first ultrasonic device and a second ultrasonic device, and the first and second ultrasonic devices are arranged on a mother line of the piping being apart from each other in an axial direction of the piping.

* * * * *